US008010608B2

(12) United States Patent
Paramasivam et al.

(10) Patent No.: US 8,010,608 B2
(45) Date of Patent: Aug. 30, 2011

(54) LOCKED RECEIVE LOCATIONS

(75) Inventors: Kartik Paramasivam, Redmond, WA (US); Sanjib Saha, Bothell, WA (US); Jean-Emile Elien, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1348 days.

(21) Appl. No.: 11/146,714

(22) Filed: Jun. 7, 2005

(65) Prior Publication Data

US 2006/0277261 A1    Dec. 7, 2006

(51) Int. Cl.
*G06F 15/16* (2006.01)
*G06F 15/173* (2006.01)

(52) U.S. Cl. ......... 709/206; 709/225; 709/227; 709/238

(58) Field of Classification Search .......... 709/200–206, 709/225, 227–230, 238
See application file for complete search history.

(56) References Cited

U.S. PATENT DOCUMENTS

| | | | | |
|---|---|---|---|---|
| 5,117,352 A * | 5/1992 | Falek | ............................ | 714/4 |
| 6,009,484 A * | 12/1999 | Miller | ............................ | 710/40 |
| 6,094,663 A * | 7/2000 | Snow et al. | ............................ | 707/201 |
| 6,151,567 A * | 11/2000 | Ames et al. | ............................ | 703/13 |
| 6,389,420 B1 * | 5/2002 | Vahalia et al. | ............................ | 707/8 |
| 6,493,826 B1 * | 12/2002 | Schofield et al. | ............................ | 726/22 |
| 6,629,175 B1 * | 9/2003 | Manning et al. | ............................ | 710/200 |
| 6,792,466 B1 * | 9/2004 | Saulpaugh et al. | ............................ | 709/229 |
| 7,065,574 B1 * | 6/2006 | Saulpaugh et al. | ............................ | 709/225 |
| 7,188,155 B2 * | 3/2007 | Flurry et al. | ............................ | 709/219 |
| 7,349,958 B2 * | 3/2008 | Chambliss et al. | ............................ | 709/223 |
| 7,401,334 B2 * | 7/2008 | Fussell | ............................ | 718/104 |
| 7,412,518 B1 * | 8/2008 | Duigou et al. | ............................ | 709/227 |
| 7,493,400 B2 * | 2/2009 | Loaiza et al. | ............................ | 709/227 |
| 2002/0078126 A1 * | 6/2002 | Higgins | ............................ | 709/200 |
| 2003/0212818 A1 * | 11/2003 | Klein et al. | ............................ | 709/238 |
| 2004/0010716 A1 * | 1/2004 | Childress et al. | ............................ | 713/201 |
| 2004/0088347 A1 * | 5/2004 | Yeager et al. | ............................ | 709/202 |
| 2004/0225742 A1 * | 11/2004 | Loaiza et al. | ............................ | 709/229 |
| 2004/0252709 A1 * | 12/2004 | Fineberg | ............................ | 370/412 |
| 2005/0066064 A1 * | 3/2005 | Micheal et al. | ............................ | 710/1 |
| 2006/0047742 A1 * | 3/2006 | O'Neill et al. | ............................ | 709/203 |
| 2007/0150480 A1 * | 6/2007 | Hwang et al. | ............................ | 707/10 |

* cited by examiner

*Primary Examiner* — Joshua Joo
(74) *Attorney, Agent, or Firm* — Workman Nydegger

(57) ABSTRACT

The subject invention provides a system and/or a method that facilitates enhancing an adapter utilizing a locking mechanism between a receive location and a process. An interface component can receive a message related to a receive location that is an endpoint. A lock component binds the receive location to the process such that the process exclusively receives the messages from the endpoint at a single instance in real time. Moreover, the lock component can provide a replacement/switching technique, wherein a process that participates in a locking relationship can be switched with another process based at least in part upon the health of the process.

19 Claims, 10 Drawing Sheets

LOCKED RECEIVE LOCATIONS

BACKGROUND OF THE INVENTION

Continued advancements in computer and networking technologies have transformed the computer from a high-cost, low performance data processing machine to a low cost and efficient communications, problem solving and entertainment system that has revolutionized the manner in which personal and business related tasks are performed each day. Examples of such tasks include basic correspondence, purchasing goods, providing goods, gathering information, requesting services, providing services, etc. Traditionally, personal tasks such as corresponding with friends and family required a person to obtain paper, a writing utensil, an envelope and a stamp, generate a hardcopy of the correspondence, and deposit the letter in the mail. The foregoing generally required the consumer to expend money and time and necessitated travel to obtain supplies and/or mail the letter. Additionally, the recipient would not receive the letter until hours or days later, depending on how much the sender was willing to pay for a mailing service. Conventional business transactions commonly involve several phone conversations, paper communication (e.g., mail and fax), and/or in-person interaction with one or more parties; and, in some instances, one or more of the parties could turn out not to be a suitable partner, for example, due to cost, proximity or inability to meet transaction needs.

Today, an increasing number of personal and business transactions are likely to be facilitated and/or performed with computer and networking technologies. For example, correspondence, bill paying, shopping, budgeting and information gathering can all be achieved with the assistance of a computer connected to an appropriate network and with suitable user privileges. By way of example, a consumer/provider can obtain a computer (e.g., a desktop computer, a laptop, a handheld, a cell phone, etc.) and interface it with a network such as a LAN, a WAN, a Wi-Fi network, the Internet, etc. The network can provide a communications link from the computer to one or more other computers (e.g., servers), which can be located essentially anywhere throughout the world. This link can be utilized to exchange data, consume merchandise, and access a wealth of information residing in a repository of data banks, for example. Another advantage of such communication is that it can be utilized at the convenience of one's home, at the user's fingertips or a click of a mouse button, and, at many times, at no or minimal expense to the user.

A growing trend is to leverage the benefits of the web domain to facilitate completing personal and business transactions since the web domain can provide user-friendly interface, a relatively secure environment, interoperability, and a developer-friendly environment, for example. In the web domain, services associated with various web sites and/or disparate web servers can be accessed through a web browser. For example, a web user can deploy a web browser and access a web site by entering the site's Uniform Resource Locator (URL) into an address bar of the web browser. A typical URL includes at least four pieces of information that facilitate establishing a link to the web site. Namely, the URL can include a protocol (a communications language) that indicates a set of rules and standards for information exchange, an address or location of the web site, a name of an organization that maintains the web site, and a suffix (e.g., com, org, net, gov and edu) that identifies the type of organization. As an example, an exemplary fictitious address http://www.foo.com can be delineated as follows: "http" can specify that the web server utilizes Hypertext Transfer Protocol (HTTP); "://" is standard URL syntax; "www" can specify the web site resides within the World Wide Web ("web"); "foo" can specify the web server is located at Foo Corporation; "com" can specify that Foo Corporation is a commercial institution; and "." is utilized as a separator between the foregoing fields.

This distributed means of communication (communication between computers residing at disparate locations) over the Internet has lead to a concept referred to as a "web service." In general, a web service can be defined as an application that executes in connection with the web to provide a mechanism to locate and select a service provider to carry out a task or to provide such services. In many instances, communication amongst such services includes providing information related to the task and/or services offered by disparate users. Such information can be utilized to facilitate matching a service that is requesting a provider with a suitable service provider. In general, to provide such matching, context-based routing can be employed, wherein content-based routing is the process where intermediaries (e.g., applications) redirect incoming messages utilizing adapters based at least in part upon the content of the message. In conventional systems and/or methods, such adapters and/or transports have various limitations in wire protocol in polling and/or receiving messages from an endpoint.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate binding a receive location to a process allowing the process to exclusively receive messages associated with the receive location. A lock component can receive a message related to a receive location via an interface, wherein the receive location is an endpoint (e.g., mailbox, folder, POP server, etc.) from which a process amongst a collection of processes can receive messages. By providing a lock, the lock component can bind a receive location to a process such that only that particular process can receive messages from the receive location at any single instance in real time. Moreover, the lock component can employ a switching technique and/or replacement technique allowing an unhealthy process involved with a binding and/or lock relationship to be replaced by a healthy process. The switching/replacement technique can be employed allowing a particular order of messages to be preserved regardless of the replacement of processes involved in the binding relationship.

In accordance with one aspect of the subject invention, the lock component can utilize a manager component that can manage the binding between the receive location and the process. The manager component can enforce the lock between a receive location and a process, wherein any process other than the respective locked process will be denied attempts to receive messages from the locked receive location. Moreover, the manager component can initialize the binding of the receive location to a process during at least one of before, during, and after the process receives a message from such receive location. In another example, the manager component can manage the switching/replacement technique between one process involved with a binding relationship and a disparate process based at least in part upon the health of the one process.

In accordance with another aspect of the subject invention, the lock component can utilize a health component to determine the health status of a process within the collection (e.g., farm) of processes. In one example, the health component can employ a heartbeat to establish the health condition of a particular process within the set of processes. The health component can further employ various checks, thresholds, and/or validation techniques on a process to ensure the health of such process. Based at least in part upon the health status of the process, the manager component can replace such deteriorated process with a healthy process. In addition, the replacement of the unhealthy process can invoke an optimization analysis to determine the most efficient process replacement. In one example, a pre-determined ranking can be implemented such that each receive location can have a priority ranking of processes if replacement is necessary.

In accordance with another aspect of the subject invention, the lock component can further utilize a notification component and a security component. The notification component can notify an entity of the status of a locked receive location and respective affinity, wherein an entity can be, but is not limited to, a user, a process, an application, an adapter, etc. Furthermore, the notification component can notify the entity that a particular process has been recently switched and/or replaced with another process to participate in the lock relationship based at least in part upon the process deterioration of health. The security component can employ various security techniques and/or measures to protect the binding and/or locking of a receive location to a process. In other aspects of the subject invention, methods are provided that facilitate binding a receive location to a process allowing the process to exclusively receive messages associated with the receive location.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
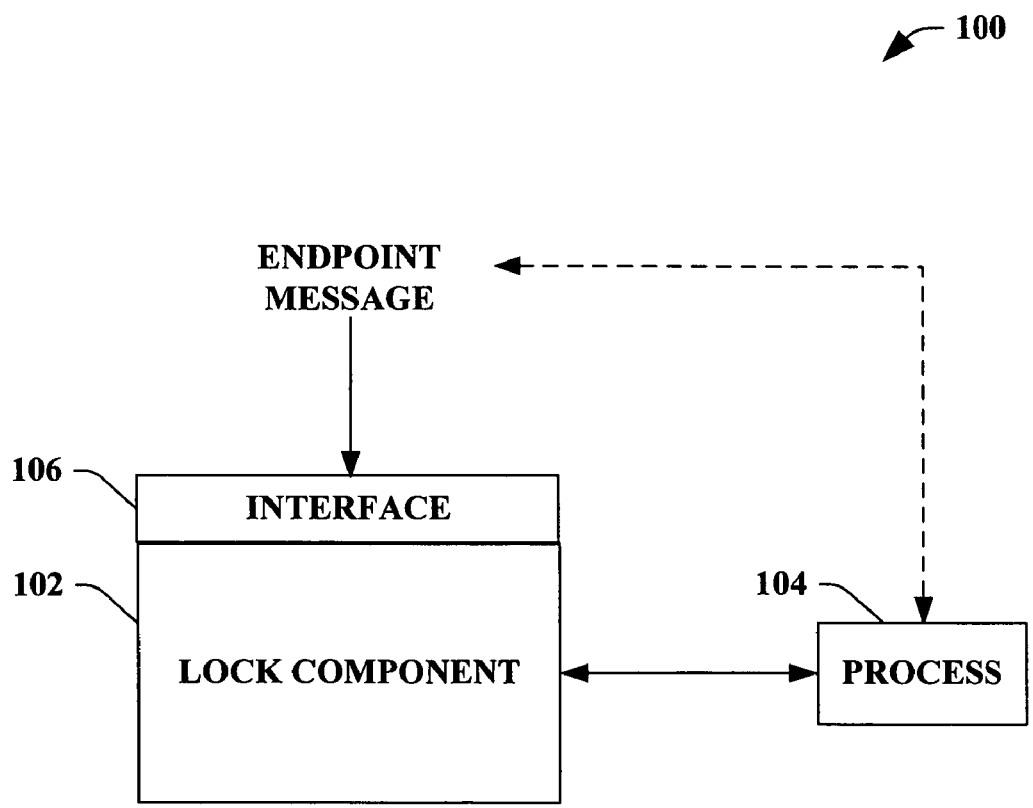
FIG. 1 illustrates a block diagram of an exemplary system that facilitates enhancing an adapter utilizing a locking mechanism between an endpoint and a process.

As utilized in this application, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates enhancing an adapter utilizing a locking mechanism between an endpoint and a process. A lock component 102 can receive a message related to an endpoint via an interface 106, wherein the endpoint is a receive location from which a process 104 receives messages. The lock component 102 can bind the endpoint to a particular process 104 allowing the process 104 to receive messages from such endpoint. In other words, the lock component 102 can lock the process 104 to an endpoint (e.g., a mailbox, a folder, etc.) allowing that process to exclusively receive messages from the endpoint. By locking the endpoint to the process, the lock component 102 allows a single process in an application collection (e.g., farm) to receive messages from a given endpoint. The locking mechanism employed by the lock component 102 allows a receive location to be configured such that two or more applications (e.g., containing at least one adapter that receives messages from an endpoint and/or receive location) can execute substantially similar code to receive messages from the receive location. It is to be appreciated that the message can be related to any suitable endpoint and/or any content-based routing system implementing an endpoint(s).

For instance, a receive location is an endpoint from which the process 104 can receive messages. An application adapter can receive a message from a proxy mailbox to send to the process 104, wherein the proxy mailbox can be considered an endpoint. Conventionally, there cannot be two instances of the application adapter based at least in part upon docking semantics at a mailbox level. Yet, the lock component 102 allows a single process in an application collection (e.g., farm) to receive messages from a given endpoint by invoking a locking mechanism between the process 104 and an endpoint allowing two instances of the application adapter to exist.

Furthermore, the lock component 102 can invoke a switching/replacement technique between the process 104 locked to an endpoint based at least in part upon the process 104 deterioration. If a process owning the particular endpoint and/or receive location dies, fails, and/or deteriorates, the lock component 102 can replace the ownership of such endpoint and/or receive location with a healthy and/or active process, wherein the healthy and/or active process can be bound to the endpoint and/or receive location. It is to be appreciated that the switching technique between processes can be associated with any deterioration and/or failure related to the process 104.

For example, if the lock component 102 locks a process A with the receive location X and the process A deteriorates, the lock component 102 can lock the receive location X to a healthy process B. In other words, the lock component 102 can change the ownership of an endpoint and/or receive location if the process 104 goes down allowing another process (e.g., not affiliated to a binding with a receive location) to pick such endpoint and/or location up. For instance, the system 100 can utilize a clustering technology (e.g., active-passive node in a cluster), wherein an active node can go down and a passive node can take such ownership over. In another example, the lock component 102 can preserve the order of messages from a given endpoint regardless of the process deterioration. The lock component 102 can allow multiple processes to be configured to receive from a particular endpoint, such that if one process fails, another process can start receiving message from the endpoint while still preserving the order of the messages.

Moreover, the system 100 can include any suitable and/or necessary interface component 106, which provides various adapters, connectors, channels, communication paths, etc. to integrate the lock component 102 into virtually any operating and/or database system(s). In addition, the interface component 106 can provide various adapters, connectors, channels, communication paths, etc., that provide for interaction with the lock component 102, the process 104, and messages related to an endpoint and/or receive location.

Figure 2:
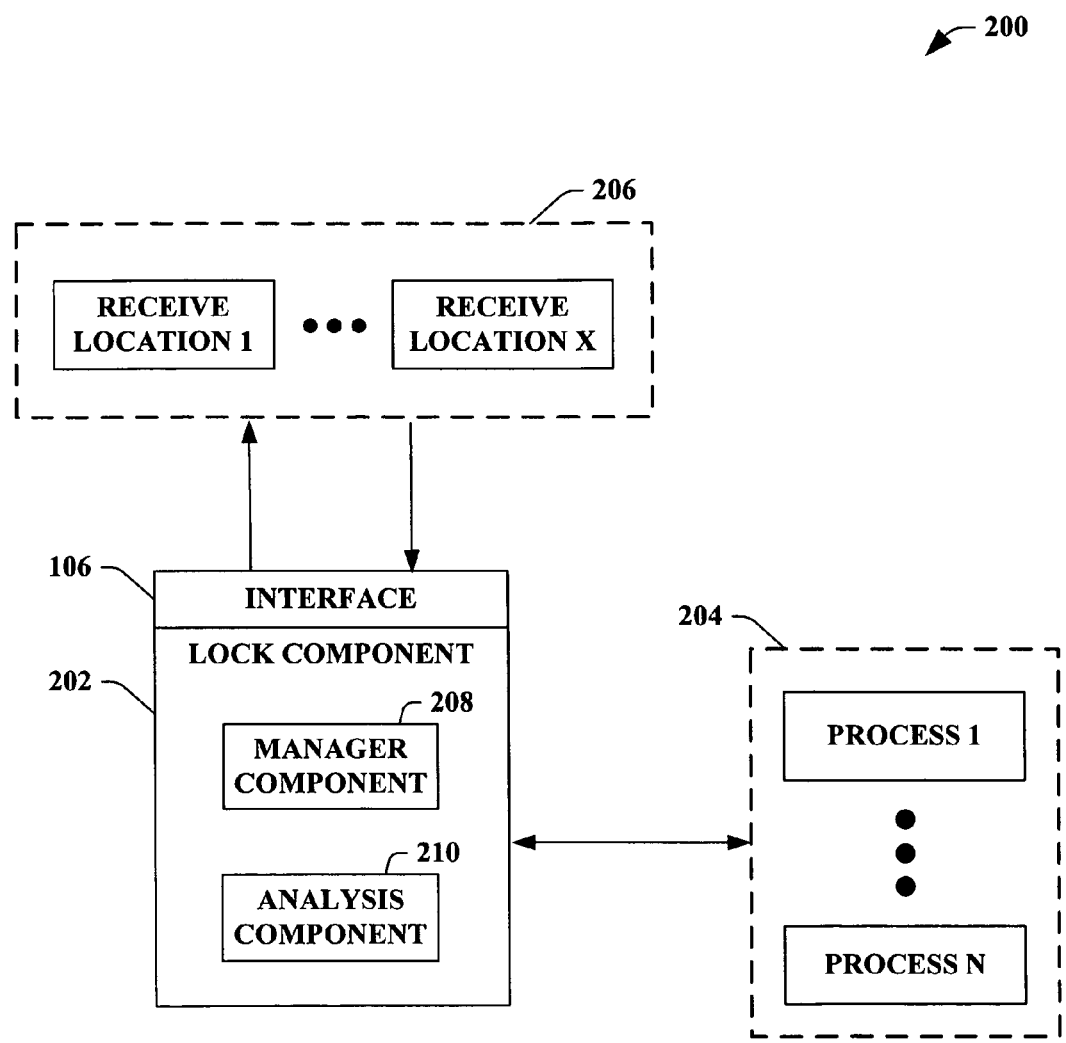
FIG. 2 illustrates a block diagram of an exemplary system that facilitates binding a receive location to a process allowing the process to exclusively receive messages associated with the receive location.

FIG. 2 illustrates a system 200 that facilitates binding a receive location to a process allowing the process to exclusively receive messages associated with the receive location. A lock component 102 can associate a particular process from a collection (e.g., farm) of processes 204 with a particular receive location from a plurality of receive locations 206. It is to be appreciated that the collection of processes 204 can include a process 1 to a process N, where N is an integer greater than or equal to 1. Additionally, it is to be appreciated that the plurality of receive locations can include a receive location 1 to a receive location X, where X is an integer greater than or equal to 1. The lock component 202 can bind a particular process within the collection of processes 204 to a specific receive location within the plurality of receive locations 206, wherein such binding allows the particular process to exclusively receive messages related to the receive location (e.g., endpoint) at a single point of real time. In other words, within the collection of processes 204, only a single process can receive messages from a particular receive location within the plurality of receive locations 206 based at least in part upon the locking technique employed by the lock component 202. Moreover, it is to be appreciated that the plurality of receive locations 206 can be any suitable packet system and the subject invention is not limited to such examples as described above.

For example, an adapter and/or transport can utilize a wire protocol in receiving and/or polling messages from a receive location, wherein the receive location is an endpoint (e.g., a mailbox, a folder, POP server, etc.) from which a process can receive messages. The lock component 202 can lock a receive location to a process such that a single process within the collection of processes 204 can exclusively receive messages from the locked receive location. It is to be appreciated that various applications can include an adapter and/or transport that can receive and/or poll messages from a receive location, wherein the lock component 202 can invoke a lock between a process and the receive location such that only one process is associated with the receive location at any single instance of real time.

The lock component 202 can further employ an optimized matching technique, wherein a receive location exclusively locked to a process can be matched to a disparate process based at least in part upon the process health. Thus, a process that fails can have any other suitable process replace with the failed process, such that the suitable process is involved in the binding relationship. Moreover, the lock component 202 can preserve the order of receive messages in the event of one process failing by allowing a healthy process to start receiving messages from the locked receive location. In other words, the locked receive location that receives messages in a preserved order can be locked to a disparate process if the original process fails and/or goes down.

The lock component 202 can include a manager component 208 that can manage any binding between a single process within the collection of processes 204 and a single receive location within the plurality of receive locations 206. In other words, the manager component 208 can maintain the various configurations (e.g., locked or unlocked) associated with the plurality of receive locations 206. It is to be appreciated that the configurations related to a receive location can be initialized before, during, and/or after a process receives a message therefrom. The manager component 208 can enforce a lock between a process and a receive location such that if any process within the collection of processes 204 attempts to receive messages from the locked receive location, the manager component 208 can disallow such attempts. For example, a receive location B can be locked via configurations to a process W, wherein the manager component 208 can enforce the affinity based at least in part upon the configurations associated therewith.

Moreover, the manager component 208 can manage the switching technique employed upon a failing process and/or a process that is down/failed to ensure the receive location is locked to a disparate process. The manager component 208 can replace a failing process that is bound to a receive location with a healthy process within the collection of processes 204. It is to be appreciated that the manager component 208 can replace/switch the failing process with a disparate healthy process based at least in part upon an analysis component 210 that determines a suitable replacement process for the receive location. For instance, the analysis component 210 can utilize an optimization analysis such as a pre-determined ranking of the collection of processes 204, wherein a ranking is provided for each particular receive location. In another example, the ranking can be dynamically determined by the analysis component 210 based at least in part upon a system resource and/or processor availability.

In addition, the analysis component 210 can analyze various receive locations and/or processes to determine a bind relationship in associated with the manager component 208.

In one example, the analysis component 210 can utilize a receive location configuration (e.g., set by a user) to allow the manager component 208 to enforce such affinity relationship (e.g., between the receive location and a process). In other example, the analysis component 210 can analyze existing receive locations and the processes that receive messages there from, wherein such analysis can determine an efficient locking between such receive locations and processes.

Figure 3:
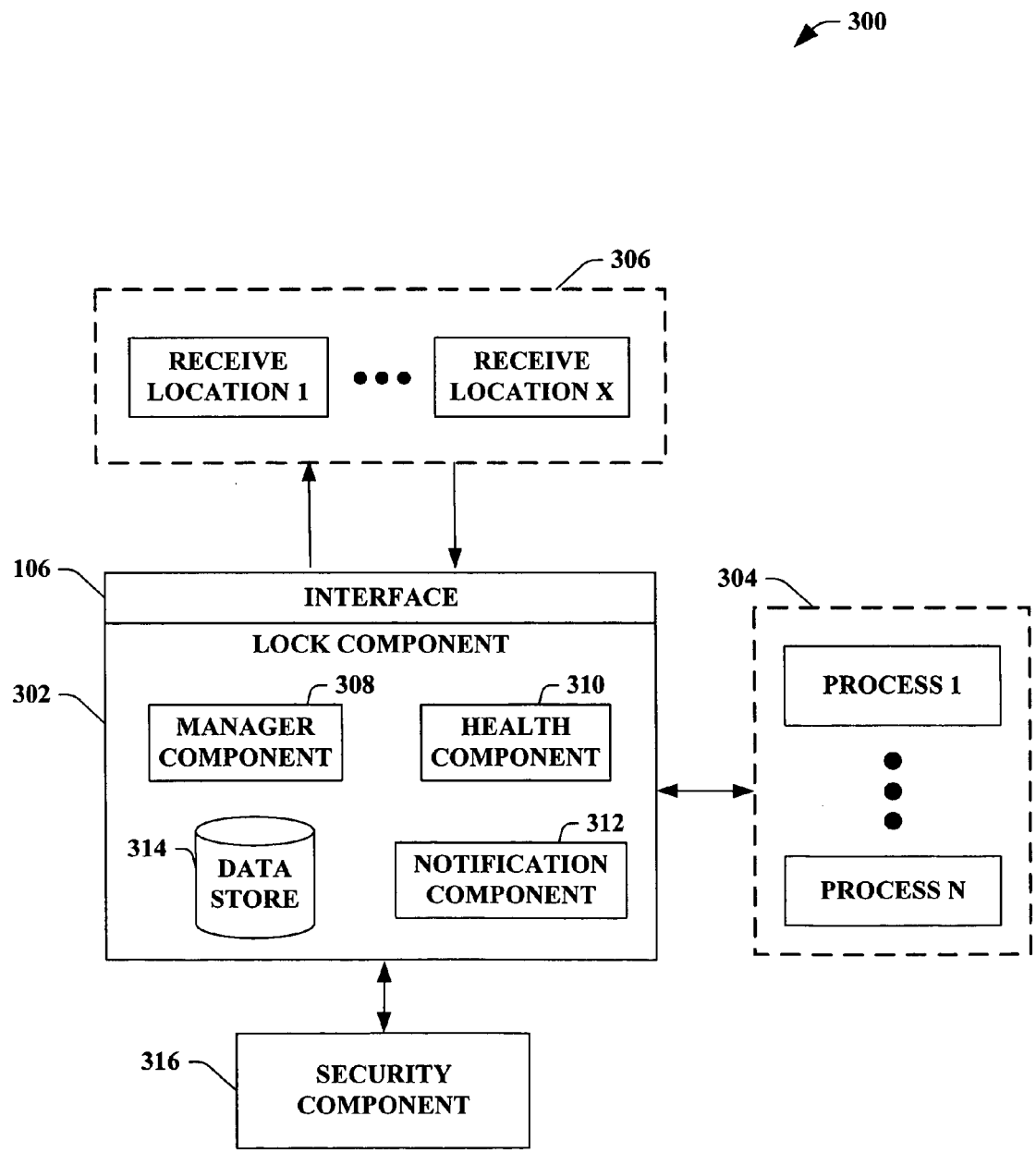
FIG. 3 illustrates a block diagram of an exemplary system that facilitates enhancing an adapter with a binding technique between a receive location and a process allowing exclusive interaction.

FIG. 3 illustrates a system 300 that facilitates enhancing an adapter with a binding technique between a receive location and a process allowing exclusive interaction. A lock component 302 can bind a process within a collection of processes 304 to a receive location within a plurality of receive locations 306 allowing the process and receive location to have a one-to-one correspondence. The plurality of receive locations 306 can have a receive location 1 to a receive location X, where X is an integer greater than or equal to 1. Similarly, the collection of processes 304 can have a process 1 to a process N, where N is an integer greater than or equal to 1. The lock component 302 can further invoke a switch between affinities based at least in part upon the health of the process. For example, a receive location locked to a first process can be switched such that the receive location is locked to a disparate process if the first process has deteriorated, failed, and/or unable to receive messages. It is to be appreciated that the lock component 302, the collection of processes 304, and the plurality of receive locations 306 can be substantially similar to the lock component 202, and 102, the collection of processes 204, and the plurality of receive locations 206 of FIGS. 2 and 1 respectively.

The lock component 302 can include a manager component 308 that can efficiently manage the binding associated with a receive location and a process. For instance, the manager component 308 can enforce the aspect of a receive location being locked to an exclusive process at any single point in real time. The manager component 308 can be utilized to configure each receive location lock setting within the plurality of receive locations 306. For instance, a user can utilize the manager component 308 to lock a receive location C to a process U.

Additionally, the manager component 308 can determine the re-assignment of a process to a receive location based at least in part upon a deterioration of the assigned process. A health component 310 can determine the health and/or status of any process within the collection of processes 304. For example, the health component 310 can initiate various checks, thresholds, and/or validation techniques on a process to ensure the health of such process. In one example, the health component 310 can utilize a heartbeat, wherein the heartbeat can be a background activity that can update the health of a process. The heartbeat can be, but is not limited to, a ping, a periodic signal, etc. In particular, the health component 310 can provide the health status of the individual processes within the collection of processes 304 to facilitate the replacement of a deteriorating process bound to a receive location via the manager component 308.

The lock component 302 can further include a notification component 312 that can notify an entity of the status of a locked receive location and respective affinity. For instance, the notification component 312 can notify an entity (e.g., a user, a process, an application, an adapter, a host, etc.) which process is locked to a receive location. Moreover, the notification component 312 can notify the entity that a particular process has been recently switched and/or replaced with another process to participate in the lock relationship based at least in part upon health deterioration of the process. It is to be appreciated that the notification component 312 can utilize any suitable technique and/or mechanism to provide the notifications described above. For example, the notification can utilize a control message (e.g., a signal for an active processor in a server collection), an email, a text message, a posting on the Internet, etc.).

The lock component 302 can utilize a data store 314, wherein the data store 314 can store various data related to the system 300. The data store 314 can provide storage for receive location configurations, locking pairs and/or affinities (e.g., between a receive location and a process), a ranking for process priority related to a switching/replacement technique, a listing of available processes and/or receive locations, etc. The data store 314 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 314 of the subject systems and methods is intended to comprise, without being limited to, these and any other suitable types of memory. In addition, it is to be appreciated that the data store 314 can be a server, a database, a hard drive, and the like.

Furthermore, the system 300 can include a security component 316 that can implement various security techniques in conjunction with the binding of a process to a receive location to prevent any unwanted and/or security risk manipulations. For example, the security component 316 can utilize a user name and password associated with a configuration of at least one receive location within the plurality of receive locations 306. In addition, the security component 316 can employ security measures such as, but not limited to, a login, a password, biometric indicia (e.g., a fingerprint, a retinal scan, inductance, etc.), voice recognition, human interactive proofs (HIPS), etc.

Figure 4:
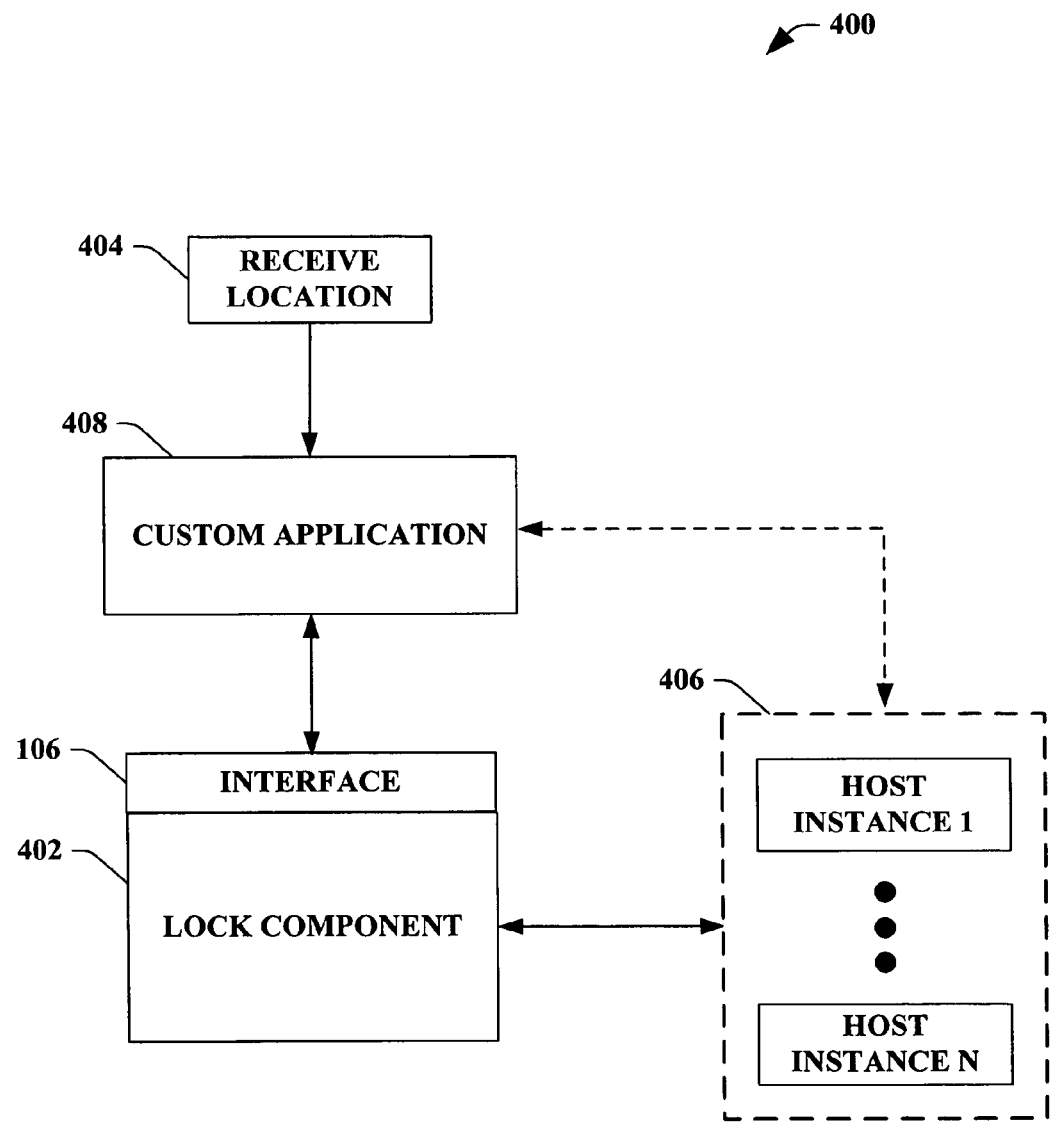
FIG. 4 illustrates a block diagram of an exemplary system that facilitates incorporating a locking mechanism between a receive location and a host instance.

FIG. 4 illustrates a system 400 that facilitates incorporating a locking mechanism between a receive location and a host instance. A lock component 402 can bind a host instance within a plurality of instances of a host 406 to a custom application 408 that receives messages from a receive location 404. The lock component 402 locks the receive location 404 to a host instance, wherein the custom application 408 is executed in one host at any given instance in real time. As illustrated, the plurality of instances of a host 406 can include a host instance 1 to a host instance N, where N is an integer greater than or equal to 1. Moreover, the lock component 402 provides the execution of the custom application 408 in another instance of that host if the host goes down, deteriorates, and/or dies (e.g., a fail over). It is to be appreciated that the lock component 402 can be substantially similar to the lock component 302, 202, and 102 of FIGS. 3, 2, and 1 respectively.

For instance, a custom application 408 can be code written by external parties, wherein a host process can execute such code. Within the custom application 408, each instance can be configured to perform substantially similar operations. Each custom application 408 is custom code that receives a message from a configured receive location 404 and pushes such message into a host system. Considering several instances of a host, the custom application 408 can be hosted across many physical machines. The system 400 can provide a locking technique that executes the custom application in one host at any given instance in time. Additionally, if the host fails and/or dies, the custom application 408 can be executed in another instance of that host (e.g., a fail over).

Figure 5:
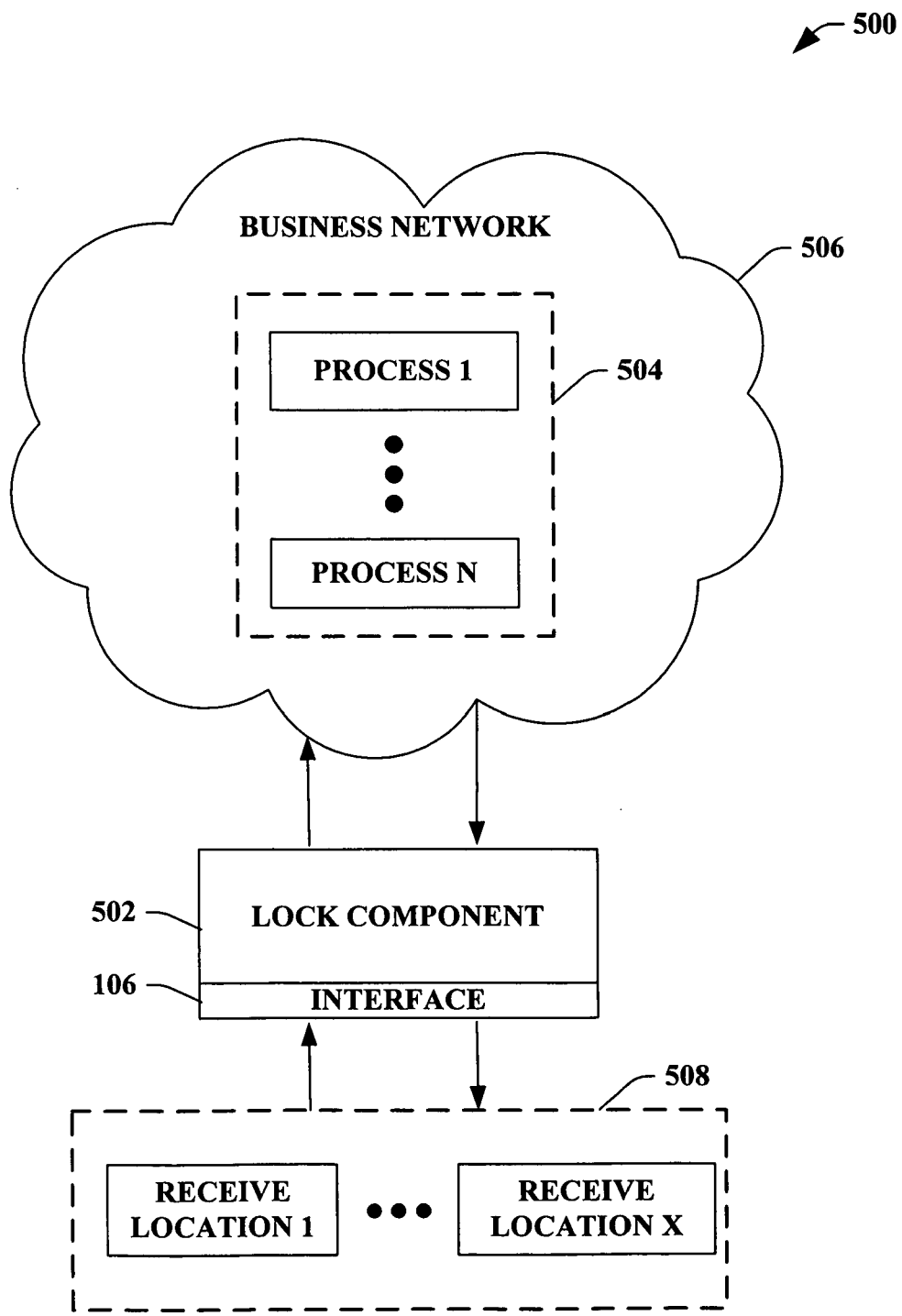
FIG. 5 illustrates a block diagram of an exemplary system that facilitates locking a process within a business network to receive messages exclusively from a receive location.

FIG. 5 illustrates a system 500 that facilitates locking a process within a business network to receive messages exclusively from a receive location. A lock component 502 can bind a process within a collection of processes 504 to a receive location amongst a plurality of receive locations 508, wherein the binding allows the process to exclusively receive messages from the receive location. The collection of processes 504 can have a process 1 to a process N number of processes, where N is an integer greater than or equal to 1. Similarly, the plurality of receive locations can have a receive location 1 to a receive location X number of receive locations, where X is an integer greater than or equal to 1. The collection of processes 504 can be associated with a business network 506, wherein the business network can be a host to such collection of processes 504. It is to be appreciated that the lock component 502 can be substantially similar to the lock component described in previous figures.

The business network 506 can be an integration server product that enables the development, deployment, and/or management of an integrated business process and/or extensible markup language (XML) based Web service. The business network 506 can unite separate applications into a coherent whole, wherein a deep integration between messaging, orchestration, security, and support for industry standards can be provided. Furthermore, the business network 506 can provide, but is not limited to providing, a business activity service, a human workflow service, and/or a business activity monitoring framework that enables interaction with business processes. The business network 506 can further connect applications within a single organization (e.g., commonly referred to as enterprise application integration (EAI)), and/or connect applications in different organizations (e.g., referred to as business to business (B2B) integration).

In one example, the business network 506 can enable the creation of a business process that spans multiple applications by providing: 1) a manner to specify the business process; and 2) a technique for communicating between applications that such business processes utilize. In this example, the business network 506 can implement a business process which includes one or more orchestrations, wherein the orchestration consists of executable code. For instance, an orchestration can be created by graphically organizing a defined group of shapes to express the conditions, loops, and other behavior of the business process. In another example, the business network 506 can utilize a business rules engine to provide the expression of rules in a business process. It is to be appreciated that each orchestration creates a subscription to indicate the kinds of messages received therewith. A message can be received by an adapter, wherein a pipeline can transform the message into a particular format (e.g., XML). Such formatted message can be stored into a database, wherein such messages can be dispatched to a target orchestration to partake in an action respective to the business process. The result of such process can be another message, typically saved in the database. The resultant message can then be processed by a send pipeline that can convert and/or format the message from the internal format (e.g., XML) to a format particular to a destination and sent to such destination via an adapter. The above is one example of the business network 506 and is not to be seen as a limitation on the subject invention.

The business network 506 can be a host that supports a concept of stateful instances, wherein an instance can be created and a state can be associated with that instance. This instance and state associated therewith can also be referred to as an application or service instance. The host process (e.g., host instance) can lock the service instance such that other instances of the host are unable to perform operations on that service instance. Moreover, the business network can be a host that utilizes a heartbeat as a background activity to update the health of a host. The heartbeat can be periodically checked by a background database to detect if an instance of a host has died. If the host has died, the background process can unlock existing service instances from the current host instance.

In addition, a mechanism can be utilized to notify other running instances of the host (e.g., process) when one host dies. As described above, a control message can be employed, wherein such control message can further indicate which service instance has been affected. A host layer can also respond to the control message corresponding to a given service instance. Upon receipt of this control message, the host tries to lock the service instance (e.g., corresponding to the control message). Once a host instance has successfully locked a service instance, the host can create the application instance and execute it. By implementing the above, the application can be guaranteed to be executed in only a single host process/instance. In another example, the host that executes the application can utilize existing configuration data that corresponds to the application to determine whether the application requires locking to a particular host process/instance. Furthermore, the system 500 can specify what the initial host instance that the application should be executed therewith. By utilizing such a technique, the location of an application execution can be controlled initially.

Figure 6:
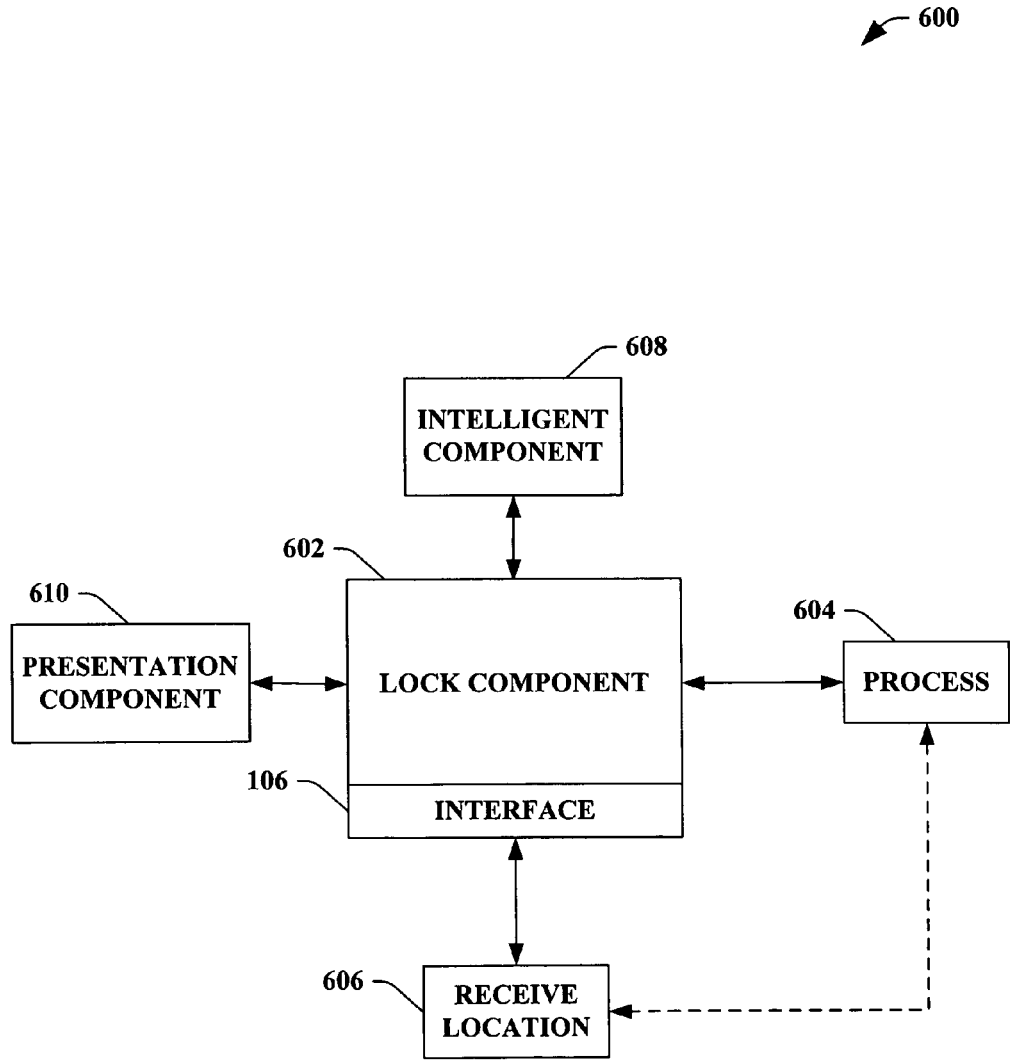
FIG. 6 illustrates a block diagram of an exemplary system that facilitates enhancing an adapter utilizing a locking mechanism between a receive location and a process.

FIG. 6 illustrates a system 600 that employs intelligence to facilitate enhancing an adapter utilizing a locking mechanism between a receive location and a process. The system 600 can include a lock component 602, a process 604, and a receive location 606 that can all be substantially similar to respective components, processes, and receive locations described in previous figures. The system 600 further includes an intelligent component 608. The intelligent component 608 can be utilized by the lock component 602 to facilitate binding a receive location 606 to a process allowing the process 604 to exclusively receive messages associated with the receive location 606. For example, the intelligent component 608 can infer the binding of the receive location 606 to the process 604, the deterioration of health associated with the process 604, switching a deteriorated process with a healthy process (e.g., such that the healthy process is bound with a receive location), etc.

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 610 can provide various types of user interfaces to facilitate interaction between a user and any component coupled to the lock component 602. As depicted, the presentation component 610 is a separate entity that can be utilized with the lock component 602. However, it is to be appreciated that the presentation component 610 and/or similar view components can be incorporated into the lock component 602 and/or a stand-alone unit. The presentation component 610 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the lock component 602.

Figure 7:
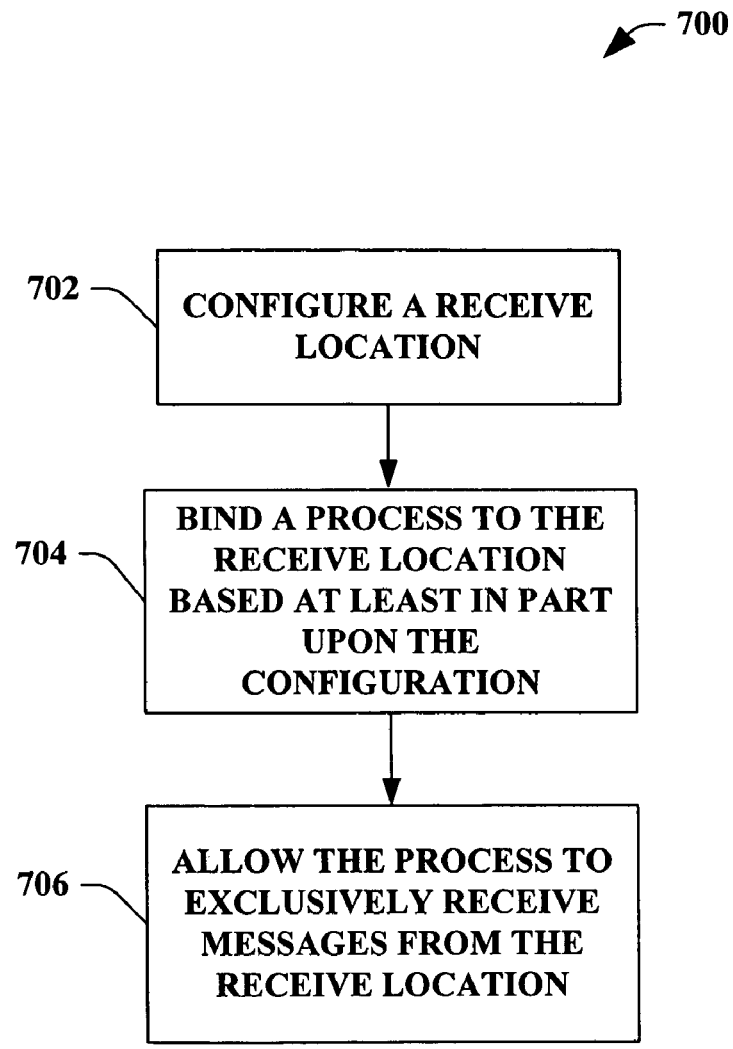
FIG. 7 illustrates an exemplary methodology for binding a receive location to a process allowing the process to exclusively receive messages associated with the receive location.
Figure 8:
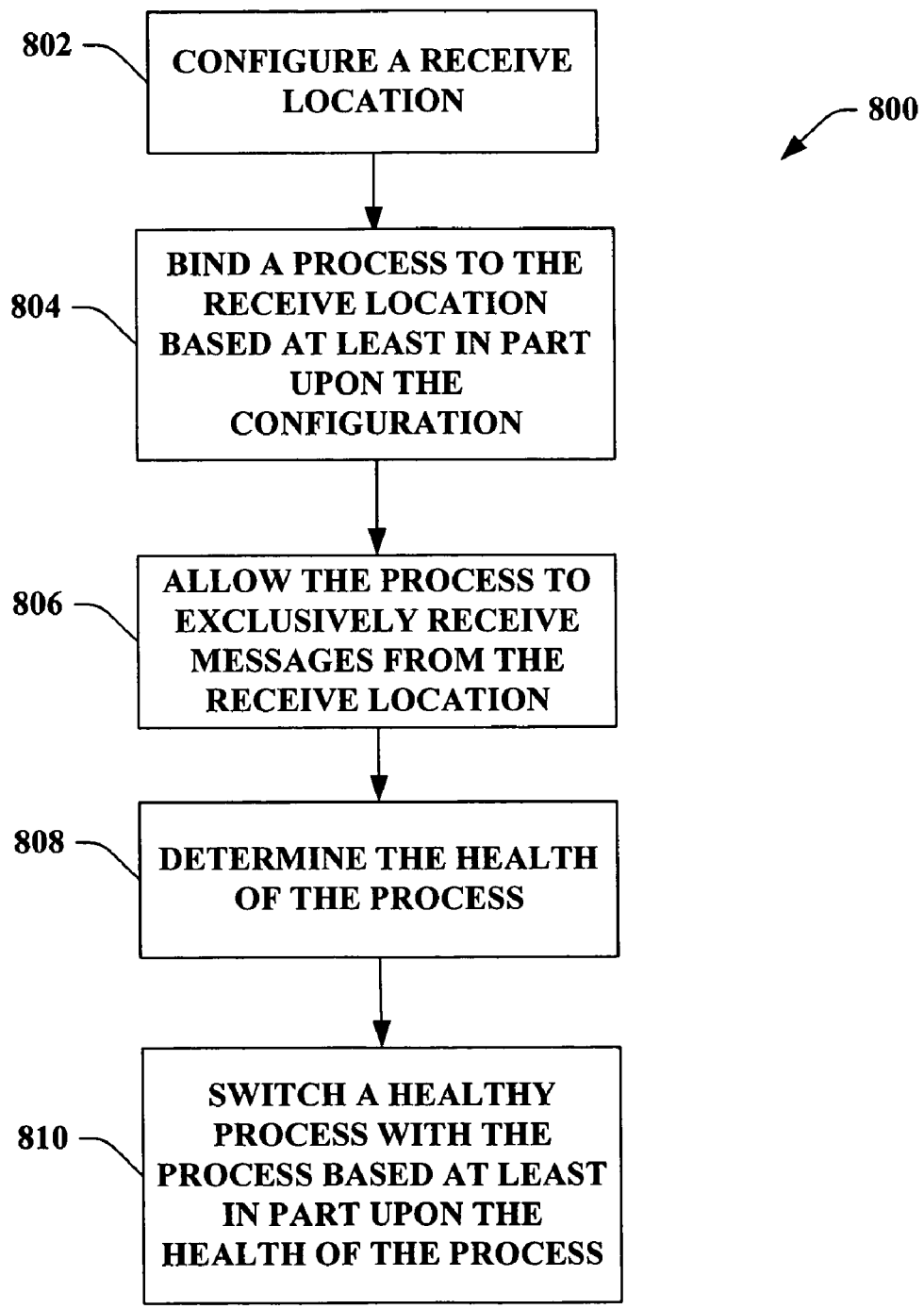
FIG. 8 illustrates an exemplary methodology that facilitates switching a locked receive location from an unhealthy process to a healthy process.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels FIGS. 7-8 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 7 illustrates a methodology 700 for binding a receive location to a process allowing the process to exclusively receive messages associated with the receive location. At reference numeral 702, a receive location can be configured such that it is a locked receive location. A receive location can be an endpoint from which a process can receive messages. The configuration of a receive location can be set as "locked" by, for instance, a user, a developer, a process, a host, etc. Based at least in part upon the configuration of the receive location, a process can be bound to the receive location at reference numeral 704. At reference numeral 706, the process exclusively receives messages from the receive location based at least in part upon the configuration of such location being "locked" to the particular process. The exclusivity of the binding relationship is such that only the single process can receive messages from the receive location at any single point in real time.

FIG. 8 illustrates a methodology 800 that facilitates switching a locked receive location from an unhealthy process to a healthy process. At reference numeral 802, a receive location that is an endpoint from which a process receives messages can be configured to a "locked" setting. At reference numeral 804, a process can be exclusively bound to the receive location based at least in part upon the configuration. For instance, the configuration can be a binding between a receive location G and a process H. At reference numeral 806, the process exclusively receives messages from the receive location based upon the associated affinity. Thus, the receive location is locked to the particular process allowing only the process to receive messages from the receive location at any single instance of real time.

At reference numeral 808, the health of a process related to a binding relationship (e.g., between a process and a receive location) can be determined. The health of the process can be monitored utilizing any suitable technique such as a heartbeat, ping, etc. Moreover, the condition of the process can be compared to a threshold, wherein the process can be determined to be unhealthy, deteriorated, failed, and/or dead based at least in part upon the threshold comparison. In another example, the process can have a pre-determined expected life expectancy, wherein the process can be determined to be unhealthy upon the expiration of such time length.

At reference numeral 810, a healthy process can be switched with the unhealthy-determined process based at least in part upon health analysis. For example, a receive location can be locked to a first process, wherein the first process can be monitored for health. Based upon a determination of the first process deteriorating, failing, and/or going down, the first process can be switched with a new process to participate in the lock relationship with the receive location.

The new process can be optimally determined by utilizing optimizing techniques, analysis, and/or historic data. In one example, the new process can be from a pre-determined ranking list of processes for each particular receive location. Moreover, the message order at a receive location can be preserved during the switching of processes.

Figure 9:
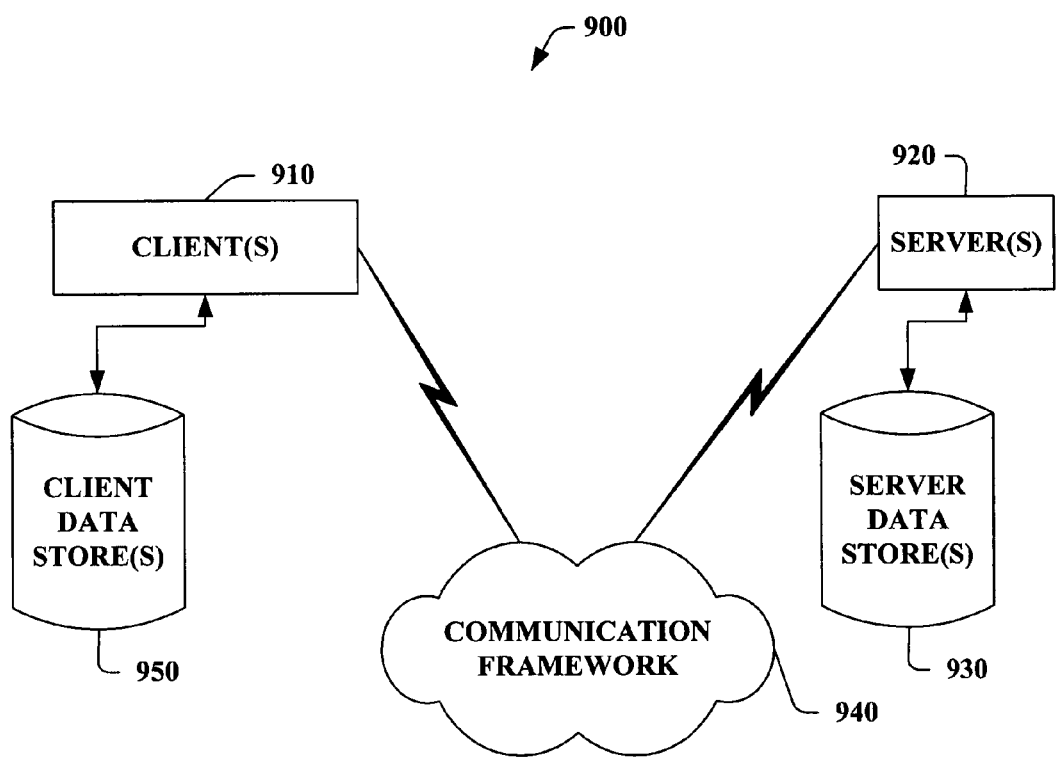
FIG. 9 illustrates an exemplary networking environment, wherein the novel aspects of the subject invention can be employed.
Figure 10:
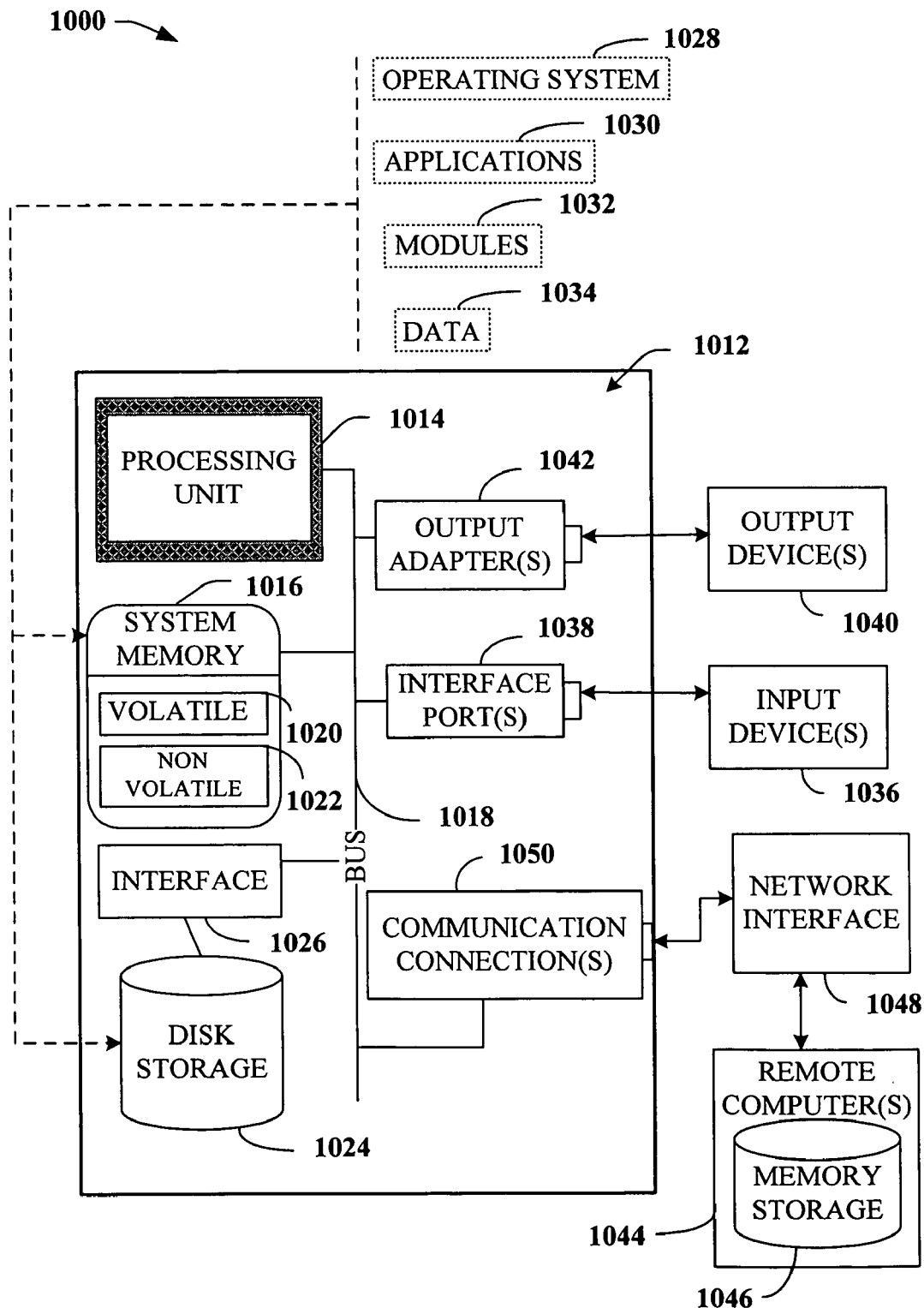
FIG. 10 illustrates an exemplary operating environment that can be employed in accordance with the subject invention.

In order to provide additional context for implementing various aspects of the subject invention, FIGS. 9-10 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject invention, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 940.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that enables a single process instance from among a plurality of process instances to be locked to a receive location such that only the singled locked process instance is sent messages received by the receive location, the system comprising:
   one or more processors configured to execute;
   an interface component of an endpoint that receives messages;
   a lock component that determines that a configuration of the endpoint is set to lock and locks the endpoint to a first process instance from among a plurality of process instances such that only the first process instance is sent messages received by the endpoint while the first process instance is locked to the endpoint; and
   a manager component that monitors a status of the first process instance, and upon determining that the first process instance is not functioning at a minimum level, selects a second process instance from among the plurality of process instances and locks the second process instance to the endpoint such that only the second process instance is sent messages received by the endpoint while the second process instance is locked to the endpoint;
   wherein the manager component detects and disallows attempts by any of the plurality of process instances not locked to the endpoint to receive the messages, and maintains various configurations for a plurality of endpoints that indicate whether a relationship between each of the plurality of endpoints and a process instance is set to be locked or unlocked.

2. The system of claim 1, wherein the endpoint is at least one of a mailbox, a folder, or a post office protocol (POP) server.

3. The system of claim 1, wherein each of the plurality of process instances is associated with a business network, and wherein the process instance that is locked to the endpoint maintains state information of the business network.

4. The system of claim 3, wherein each process instance includes code that is executed by the process instance only when the process instance is locked to the endpoint, wherein the code, when executed, passes messages to the business network.

5. The system of claim 4, wherein the code implements a pipeline that transforms messages received from the endpoint into a particular format and stores the transformed messages in a database.

6. The system of claim 5, wherein the transformed messages are further sent to an orchestration of the business network.

7. The system of claim 3, wherein the business network specifies the first process instance as the process instance that is to be locked to the endpoint when the business network is started.

8. The system of claim 5, wherein the particular format is XML.

9. The system of claim 3, wherein the business network is an integration server product that enables the development, deployment, and management of an integrated business process or XML based service.

10. The system of claim 1, wherein upon locking the second process instance to the endpoint, the manager component causes the messages received by the endpoint to be sent to the second process instance in the same order the messages were received by the endpoint.

11. The system of claim 1, wherein the manager component selects the second process instance based on configuration information.

12. The system of claim 1, wherein the manager component monitors the status of the first process instance by monitoring a ping, or periodic signal, sent out by the first process instance.

13. The system of claim 1, further comprising a notification component that notifies an entity of which process instance is locked to the endpoint, wherein the entity is at least one of a user, a process, an application, an adaptor, and a host.

14. The system of claim 1, further comprising a security component that requires security credentials before an endpoint can be locked to a process instance.

15. The system of claim 14, wherein the security credentials include at least one or username/password, biometric indicia, voice recognition, or human interactive proofs.

16. A computer-implemented method that enables a single process instance from among a plurality of process instances to be locked to a receive location such that only the single locked process instance is sent messages received by the receive location, the method comprising:

determining that a configuration of an endpoint is set to lock;

locking the endpoint to a first process instance from among a plurality of process instances such that only the first process instance is sent messages received by the endpoint while the first process instance is locked to the endpoint;

monitoring by a manager component a status of the first process instance while the first process instance is locked to the endpoint; and upon determining that the first process instance is not functioning at a minimum level, selecting a second process instance from among the plurality of process instances and locking the second process instance to the endpoint such that only the second process instance is sent messages received by the endpoint while the second process instance is locked to the endpoint;

wherein the manager component detects and disallows attempts by any of the plurality of process instances not locked to the endpoint to receive the messages, and maintains various configurations for a plurality of endpoints that indicate whether a relationship between each of the plurality of endpoints and a process instance is set to be locked or unlocked.

17. The method of claim 16, further comprising: wherein each of the plurality of process instances is associated with a business network, and wherein the process instance that is locked to the endpoint maintains state information of the business network.

18. The method of claim 17, wherein each process instance includes code that is executed by the process instance only when the process instance is locked to the endpoint, wherein the code, when executed, passes messages to the business network.

19. The method of claim 18, wherein the code implements a pipeline that transforms messages received from the endpoint into a particular format and stores the transformed messages in a database.

* * * * *

UNITED STATES PATENT AND TRADEMARK OFFICE
CERTIFICATE OF CORRECTION

| | | |
|---|---|---|
| PATENT NO. | : 8,010,608 B2 | Page 1 of 1 |
| APPLICATION NO. | : 11/146714 | |
| DATED | : August 30, 2011 | |
| INVENTOR(S) | : Kartik Paramasivam et al. | |

It is certified that error appears in the above-identified patent and that said Letters Patent is hereby corrected as shown below:

In column 16, line 20, in Claim 1, delete "execute;" and insert -- execute: --, therefor.

Signed and Sealed this
Twenty-fifth Day of October, 2011

David J. Kappos
*Director of the United States Patent and Trademark Office*